3,255,153
CURING EPOXY RESINS WITH AMINOBORANE
CURING AGENTS
Allen L. McCloskey, Orange, Grover G. Collins, Santa Ana, and William David English, Garden Grove, Calif., assignors to United States Borax & Chemical Corporation, Los Angeles, Calif., a corporation of Nevada
No Drawing. Filed Nov. 14, 1960, Ser. No. 68,601
9 Claims. (Cl. 260—47)

The present invention relates as indicated to cured polyepoxide resin compositions and has more particular reference to compositions comprising a reactive polyepoxide and an aminoborane curing agent.

It is, therefore, the principal object of this invention to provide new compositions comprising a reactive polyepoxide and an aminoborane curing agent.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a composition comprising a reactive polyepoxide having more than one epoxy group per molecule and from about 2% to about 50% based on the weight of said polyepoxide, of an aminoborane curing agent, said curing agent selected from the group consisting of $R_2BNH_2$, $R_2BNHR'$, $R_2BNR'R''$, $R_2BN(CH_2)_x$, $RB(NH_2)_2$, $RB(NHR')_2$, $RB(NR'R'')_2$, $RB[N(CH_2)_x]_2$, $B(NHR')_3$, $B(NR'R'')_3$ and $B[N(CH_2)_x]_3$ where R is a radical selected from the group consisting of unsubstituted aliphatic hydrocarbon radicals having from 1 to 20 carbon atoms, substituted aliphatic hydrocarbon radicals of from 1 to 12 carbon atoms having aromatic hydrocarbon substituents, unsubstituted aromatic hydrocarbon radicals, and substituted aromatic hydrocarbon radicals having aliphatic hydrocarbon substituents of from 1 to 12 carbon atoms, and R' and R'' are radicals selected from the group consisting of unsubstituted saturated aliphatic hydrocarbon radicals having from 1 to 20 carbon atoms, unsaturated aliphatic hydrocarbon radicals having from 1 to 12 carbon atoms, substituted aliphatic hydrocarbon radicals of from 1 to 12 carbon atoms having aromatic hydrocarbon substituents, unsubstituted aromatic hydrocarbon radicals, substituted aromatic hydrocarbon radicals having aliphatic hydrocarbon substituents of from 1 to 12 carbon atoms, and heterocyclic radicals and x is an integer of from 3-7.

The reactive polyepoxides applicable to the present invention are compounds or mixtures of compounds, the average molecule of which contains more than one 1,2-epoxy groups

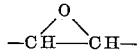

arranged in ether one or more open chain structures or in one or more cyclic structures. Owing to the methods for preparing the reactive polyepoxides, and the fact that they are sometimes a mixture of chemical compounds having different structures, and containing some groups which are not converted to 1,2-epoxy groups, the number of epoxy groups in an average molecule of the product is not necessarily a whole number, but may be a fraction thereof. However, in all instances this number of epoxy groups must be greater than one.

There are four major classes of reactive polyepoxides. These are:

(1) Glycidyl polyethers—derived from dihydric phenols such as bisphenol A, or derived from polyhydric phenols such as phenol-formaldehyde condensation products, or derived from polyols such as glycol and glycerol.

(2) Epoxidized unsaturated glycerides and abietic acid derivatives—such as epoxidized soybean oil, linseed oil, and tall oil.

(3) Epoxidized polyolefins—such as epoxidized polybutadiene and polyisoprene.

(4) Epoxidized cyclopolyolefins—such as epoxidized dicyclopentadiene, vinylcyclohexene and other Diels-Alder reaction products.

It will be recognized by those skilled in epoxy resin chemistry that the epoxidized resinous materials of 2, 3, and 4 above are derived from the peracid oxidation of the corresponding polyolefins.

It is to be clearly understood that the term "reactive polyepoxide" as used in the present specification and appended claims is intended to include all reactive polyepoxides having more than one epoxy group per molecule, and the curing agents as defined in the foregoing broadly stated paragraph and discussed in more detail hereinafter are all applicable to all such reactive polyepoxides.

The term "cured polyepoxide resin" as used in the present invention is intended to mean a polyepoxide cured to either a "class B" or to a "class C" state. A class "B" epoxy resin is one which is stable in a semicured state; it is soluble in most organic solvents and is thermoplastic, and when cured at elevated temperatures becomes thermoset. A class "C" epoxy resin is one which is thermoset and which has been formed by either going through a class "B" state or by the addition of a curing agent, with or without the application of heat.

To produce a desirable end product, a cured polyepoxide resin, the reactive polyepoxide and curing agent used must be compatible, that is, they must be miscible one with the other, at room temperature or at an elevated temperature, prior to the cure, and they must not separate while curing so that a uniform product is obtained. It is preferable that the curing agents have relatively low volatilities so that they are not lost while being admixed with the reactive polyepoxides and so that they present a minimum toxicity hazard due to fumes. The present aminoboranes meet the above requirements as curing agents.

The following list is illustrative of the aminoboranes applicable to the present invention:

Diethyl(amino)borane
Diisopropyl(anilino)borane
Diphenyl(piperidino)borane
Di-n-octyl(N-methylanilino)borane
Di-α-naphthyl(2-phenylpropylamino)borane
Diisoamyl(dimethylamino)borane
Distearyl(allylamino)borane
Di-t-butyl(2-thiopheneamino)borane
Di-2-methylphenyl(hexylamino)borane
Di-biphenyl-(stearylamino)borane
Dimethyl(β-naphthylamino)borane
Hexyl-bis(N-ethylanilino)borane
Phenyl-bis(diethylamino)borane
α-naphthyl-bis(amino)borane
Ethyl-bis(piperidino)borane
Biphenyl-bis(t-butylamino)borane
Hexyl-bis(2-pyridylamino)borane
Propyl-bis(2-thiopheneamino)borane
2,4-methylphenyl-bis(2-methylphenylamino)borane
Stearyl-bis(β-naphthylamino)borane
Isopropyl-bis(allylamino)borane
Tris(piperidino)borane
Tris(methylanilino)borane Tris(ethylamino)borane
Tris(t-butylamino)borane
Tris(anilino)borane
Tris(2-phenylethylamino)borane
Tris(4-methylanilino)borane
Tris(2-pyridylamino)borane
Tris(N-methylanilino)borane
Tris(diethylamino)borane
Tris($\alpha$-naphthylamino)borane
Tris(allylamino)borane
Tris(2-thiopheneamino)borane
Tris(di-n-octylamino)borane It is to be clearly understood that the foregoing list is only a partial enumeration of the aminoboranes applicable to the present invention, and is not intended to limit the invention.

So that the present invention can be more clearly understood, the following examples are given for illustrative purposes:

(I)

Tris(isopropylamino)borane and a glycidyl polyether were thoroughly mixed together in an amount equivalent to 9 parts of the borane per 100 parts of the reactive polyepoxide by weight. The admixture was then divided into two portions, each portion being placed in a disposable Petri dish. One portion was kept at room temperature while the other was placed in an oven heated to 120° C. The portion kept at room temperature set to a class "C" resin in 4 hours, while the heated portion set to a class "C" resin in 30 minutes.

(II)

Tris(t-butylamino)borane and a glycidyl polyether were thoroughly mixed together in an amount equivalent to 8 parts of the borane per 100 parts of the reactive polyepoxide by weight. The admixture was then divided into two portions, each portion being placed in a disposable Petri dish. One portion was kept at room temperature while the other was placed in an oven heated to 110° C. The portion kept at room temperature showed no cure after 10 days; however, the heated portion after 4 hours at 110° C. when cooled set to a solid class "B" resin which when heated to 150° C. set to a class "C" resin.

(III)

Tris(t-butylamino)borane and an epoxidized polyolefin were thoroughly mixed together in an amount equivalent to 20 parts of the borane per 100 parts of the reactive polyepoxide. The admixture was then divided into two portions, each portion being placed in a disposable Petri dish. One portion was kept at room temperature while the other portion was placed in an oven heated to 150° C. The portion kept at room temperature showed no cure after 10 days, while the heated portion resulted in a foamed class "C" resin in 18 hours.

(IV)

Diethyl(amino)borane and an epoxidized cyclopolyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days. The portion heated at 100° C. was liquid after 72 hours; however, on cooling it solidified to a class "B" resin which when heated at 150° C. for a short time set to a class "C" resin.

(V)

Tris(diethylamino)borane and a glycidyl polyether were thoroughly mixed together in an amount equivalent to 13 parts of the borane per 100 parts of the reactive polyepoxide by weight. The admixture was then divided into two portions, each portion being placed in a disposable Petri dish. One portion was kept at room temperature while the other portion was placed in an oven heated at 110° C. The portion kept at room temperature cured to a class "C" resin after two weeks while the heated portion set to a class "C" resin in 10 hours.

(VI)

Tris(diethylamino)borane and an epoxidized unsaturated glyceride were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days, while the heated portion resulted in a foamed class "C" resin after 19 hours.

(VII)

Tris(diethylamino)borane and an epoxidized cyclopolyolefin were thoroughly mixed together in an amount equivalent to 20 parts of the borane per 100 parts of the reactive polyepoxide. The admixture was then divided into two portions, each portion being placed in a disposable Petri dish. One portion was kept at room temperature while the other portion was placed in an oven heated to 100° C. The portion kept at room temperature showed no cure after 10 days, while the heated portion set to a class "C" resin after 19 hours.

(VIII)

Tris(methylamino)borane and an epoxidized polyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days, while the heated portion set to a class "C" resin after 24 hours.

(IX)

Diphenyl(piperidino)borane and an epoxidized glyceride were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days. The heated portion was still liquid after 16 hours; however, upon cooling, a gelatinous class "B" resin was formed. When heated to 170° C. the gelatinous resin set to a class "C" resin after 12 hours.

(X)

Tris(n-propylamino)borane and an epoxidized cyclopolyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days, while the heated portion set to a class "C" resin after 20 hours.

(XI)

Tris(isobutylamino)borane and an epoxidized cyclopolyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days; however, the heated portion after 9 hours resulted in a foamed class "C" resin.

(XII)

Di-n-octyl(N-methylanilino)borane and a glycidyl polyether were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature became gelatinous after 10 days and the heated portion set to a class "C" resin in 6 hours.

(XIII)

Tris(stearylamino)borane and a glycidyl polyether were thoroughly mixed together in an amount equivalent to 32 parts of the borane per 100 parts of the reactive polyepoxide. The tris(stearylamino)borane was insoluble at room temperature; however, solution was affected by heating to 50° C. The solution was then divided into two portions, each portion being placed into a disposable Petri dish. One portion was allowed to cool to room temperature and solidified to a class "B" resin in 24 hours. The second portion was placed in an oven heated to 110° C. and after 5 hours had set up to a class "C" resin.

(XIV)

Tris(N-methylanilino)borane and an epoxidized polyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 110° C. The portion kept at room temperature showed no cure after 10 days, while the heated portion set to a class "C" resin after 16 hours.

(XV)

Tris(N-methylanilino)borane and an epoxidized polyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 10 days, while the heated portion set to a class "C" resin after 10 hours and added agitation.

(XVI)

Tris(N-methylanilino)borane and an epoxidized cyclopolyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 10 days, while the heated portion set to a class "C" resin after 20 hours.

(XVII)

Tris(allylamino)borane and a glycidyl polyether were thoroughly mixed together in an amount equivalent to 25 parts of the borane per 100 parts of the reactive polyepoxide. The admixture was then divided into two portions, each portion being placed in a disposable Petri dish. One portion was kept at room temperature while the other portion was placed in an oven heated to 120° C. The portion kept at room temperature set to a class "C" resin after 12 hours. The heated portion set to a class "C" resin after 2.5 hours.

(XVIII)

Tris(anilino)borane and a glycidyl polyether were thoroughly mixed together in an amount equivalent to 9 parts of the borane per 100 parts of the reactive polyepoxide by weight. The borane was insoluble at room temperature; however, it dissolved in the polyepoxide at 40° C. The admixture was then divided into two portions, each portion being placed in a disposable Petri dish. One portion was cooled to room temperature and the borane separated from the solution and that portion was discarded. The other portion was heated in an oven for 3 hours at 110° C. wherein it set to a class "B" resin.

(XIX)

Tris(anilino)borane and a glycidyl polyether were thoroughly mixed together in an amount equivalent to 50 parts of the borane per 100 parts of the reactive polyepoxide by weight. The borane was insoluble and began to separate from the polyepoxide whereon heat was applied. The borane began to melt at 40° C. and was melted at 60° C.; however, before the borane could be completely dispersed the mixture set up to a class "C" resin.

(XX)

Tris(piperidino)borane and an epoxidized glyceride were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven at 110° C. The portion kept at room temperature did not show evidence of a cure after 10 days, while the heated portion set to a class "C" resin after 16 hours.

(XXI)

Tris(di-n-butylamino)borane and a glycidyl polyether were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days, while the heated portion set to a class "C" resin after 15 hours.

(XXII)

Isopropyl-bis(allylamino)borane and epoxidized polyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 10 days, while the heated portion set to a class "C" resin in 18 hours.

(XXIII)

n-Hexyl-bis(2-pyridylamino)borane and a glycidyl polyether were thoroughly mixed together in an amount equivalent to 35 parts of the borane per 100 parts of the reactive polyepoxide by weight. The admixture was then divided into two portions, each portion being placed into a disposable Petri dish. One portion was kept at room temperature while the other portion was placed in an oven heated to 150° C. The portion kept at room temperature cured to a class "C" resin in 24 hours, while the heated portion set to a class "C" resin in 45 minutes.

(XXIV)

Ethyl-bis(piperidino)borane and an epoxidized unsaturated glyceride were thoroughly mixed together in an amount equivalent to 15 parts of the borane per 100 parts of the reactive polyepoxide by weight. The admixture was then divided into two portions, each portion being placed into a disposable Petri dish. One portion was placed in an oven heated to 110° C. while the other portion was kept at room temperature. The portion kept at room temperature was beginning to gel after 10 days and the heated portion set to a class "C" resin in 10 hours.

(XXV)

α-Naphthyl-bis(amino)borane and an epoxidized cyclopolyolefin were thoroughly mixed together in an amount equivalent to 20 parts of the borane per 100 parts of the reactive polyepoxide by weight. The admixture was then divided into two portions, each portion being placed in a disposable Petri dish. One portion was kept at room temperature while the other portion was placed in an oven heated to 110° C. The portion kept at room temperature showed no cure after 10 days and the heated portion set to a class "C" resin in 24 hours.

From the foregoing examples it will be seen that the aminoboranes when admixed with any type of a reactive polyepoxide will result in cured polyepoxide resin compositions. We have found that from about 2% to about 50%, based on the weight of the reactive polyepoxide, of an aminoborane will induce curing and result in superior cured epoxy resin compositions.

It is sometimes desirable to add other materials to the resin composition in order to impart certain desired characteristics. It will be found that such additives do not interfere with the action of the present curing agents. Reinforcing materials such as glass, mineral and metal fibers add strength and decrease shrinkage when the composition is cured, inert granular materials such as mica, asbestos and iron oxide lower the overall cost of the finished product, thixotropic agents such as bentonite and specially prepared silicas thicken liquid epoxy compositions so that they can be applied to vertical surfaces and cured in place, and coloring agents such as titanium dioxide, cadmium yellows and organic dyestuffs overcome the amber color usually associated with a cured epoxy resin composition. These and other similar materials, known to the art, can be used in combination with the present curing agents to produce epoxy resin compositions.

The rate of cure, the curing temperature and the primary properties of the cured polyepoxide resin compositions are determined by the specific reactive polyepoxide or combination of reactive polyepoxides used, the particular aminoborane used and the amount of such aminoborane. Polyepoxide resins cured with the present curing agents are highly resistant to chemical attack, show a low moisture permeability and have excellent adhesive qualities. Many other properties such as hardness, high yield and tensile strength, electrical insulating, heat resistance, shear resistance, flexibility and wear resistance can be endowed to the cured polyepoxide resin composition by changing any one or any combination of the above variables.

Until the advent of the present invention it was necessary to use blowing agents to produce foamed epoxy resins. Now for the first time, by certain combinations of the instant curing agents and reactive polyepoxides, we can provide foamed epoxy resins without the use of blowing agents. The combinations of tris(t-buylamino)borane with an epoxidized polyolefin, tris(diethylamino)borane with an epoxidized unsaturated glyceride and tris(isopropylamino)borane with an epoxidized cyclopolyolefin when used in amounts of from about 10% to about 35% of the curing agent based on the weight of the reactive polyepoxide will provide cured foamed epoxy resin compositions of superior strength and rigidity.

It is of the utmost importance to note that in order to obtain these foamed resins the particular combinations of curing agents and reactive polyepoxide must be used in the particular amounts given above.

Due to the many superior properties of the cured polyepoxide resin compositions of the present invention they will be found to have utility as protective coatings and sealing compounds because of their superior adhesive qualities, chemical inertness, high strength and low moisture permeability. They can be used in tools and dies and as structural components in the equipment and construction fields. They can be used as adhesives for bonding together metal, wood or other plastics. They have execellent insulation properties and the admixtures of the reactive polyepoxides and aminoboranes which have long pot lives and are liquid at room temperature will find outstanding use in the potting and encapsulation of electrical components.

Other modes of applying the principle of the invention may be employed, change being made as regards the details described, provided the features stated in any of the following claims or the equivalent of such be employed.

We, therefore, particularly point out and distinctly claim as our invention:

1. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150° C., with from about 2% to about 50%, based on the weight of said reactive polyepoxide, of an aminoborane curing agent of a formula selected from the group consisting of $R_2BNH_2$, $R_2BNHR'$, $R_2BNR'R''$, $R_2BN(CH_2)_x$, $RB(NH_2)_2$, $RB(NHR')_2$, $RB(NR'R'')_2$, $RB[N(CH_2)_x]_2$, $B(NHR')_3$, $B(NR'R'')_3$ and $B[N(CH_2)_x]_3$, where R is a radical selected from the group consisting of unsubstituted aliphatic hydrocarbon radicals having from 1 to 20 carbon atoms, substituted aliphatic hydrocarbon radicals of from 1 to 12 carbon atoms having aromatic hydrocarbon substituents, unsubstituted aromatic hydrocarbon radicals, and substituted aromatic hydrocarbon radicals having aliphatic hydrocarbon substituents of from 1 to 12 carbon atoms, and R' and R'' are radicals selected from the group consisting of unsubstituted saturated aliphatic hydrocarbon radicals having from 1 to 20 carbon atoms, unsaturated aliphatic hydrocarbon radicals having from 1 to 12 carbon atoms, substituted aliphatic hydrocarbon radicals of from 1 to 12 carbon atoms having aromatic hydrocarbon substituents, unsubstituted aromatic hydrocarbon radicals and substituted aromatic hydrocarbon radicals having aliphatic hydrocarbon substituents of from 1 to 12 carbon atoms, and $x$ is an integer of from 3–7.

2. The process according to claim 1 in which said reactive polyepoxide is a glycidyl polyether of a polyhydric phenol having more than one epoxy group per molecule.

3. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150° C., with from about 2% to about 50%, based on the weight of said reactive polyepoxide, of an aminoborane curing agent of the formula $B(NHR')_3$, where $R'$ is an unsubstituted saturated aliphatic hydrocarbon radical having from 1 to 20 carbon atoms.

4. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150° C., with from about 2% to about 50%, based on the weight of said reactive polyepoxide, of an aminoborane curing agent of the formula $B(NR'R'')_3$ where $R'$ and $R''$ are each an unsubstituted saturated aliphatic hydrocarbon radical having from 1 to 20 carbon atoms.

5. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150° C., with from about 2% to about 50%, based on the weight of said reactive polyepoxide, of an aminoborane curing agent of the formula $B[N(CH_2)_5]_3$.

6. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150°, with from about 2% to about 50%, based on the weight of said reactive polyepoxide, of an aminoborane curing agent of the formula $RB(NHR')_2$ where R is an unsubstituted aromatic hydrocarbon radical, and $R'$ is an unsubstituted saturated aliphatic hydrocarbon radical having from 1 to 20 carbon atoms.

7. In the process for curing and hardening a reactive polyepoxide having more than one epoxy group per molecule which is selected from the group consisting of the condensation products of epichlorohydrin and a polyhydric phenol, the condensation products of epichlorohydrin and a polyhydric alcohol, and the products derived from the peracid oxidation of a polyolefin, said process comprising mixing and reacting said reactive polyepoxide with a curing agent to form a hard, cured resin, the improvement which consists of mixing and reacting said reactive polyepoxide, at a temperature of from about room temperature to about 150° C,. with from about 2% to about 50%, based on the weight of said reactive polyepoxide, of an aminoborane curing agent of the formula $R_2BNH_2$ where R is an unsubstituted aliphatic hydrocarbon radical having from 1 to 20 carbon atoms.

8. The process according to claim 3 in which said aminoborane curing agent is tris(isopropylamino)borane.

9. The process according to claim 1 in which said aminoborane curing agent is tris(allylamino)borane.

References Cited by the Examiner

UNITED STATES PATENTS

| 2,773,043 | 12/1956 | Zukas | 260—47 X |
| 2,927,133 | 3/1960 | Bragdon | 260—606.5 |
| 2,951,861 | 9/1960 | Stafiej et al. | 260—47 |
| 2,978,502 | 4/1961 | English et al. | 260—551 |

OTHER REFERENCES

Callery, Chemicals Technical Bulletin, C–200, "Amine-Borane," copy in Group 140, 260–2 EP, 8 pages, pages 1–8 relied on.

Lee et al.: "Epoxy Resins," McGraw-Hill Book Co., Inc., New York, 1957 (copy in S.L., TP 986.e6); copy also in Group 140, pages 19, 20 and 30 relied on.

Chemical and Engineering News, 37 (No. 18), pages 56, 57 and 58 relied on, May 4, 1959.

Zaehringer: "Solid Propellant Rockets Second Stage," American Rocket Co., Box 1112, Wyandotte, Michigan 1958, pages 209–212 relied on. Copy in S.L. TL 783.3/Z3 (1958).

Lee et al.: Soc. Plast. Eng. Journal, vol. 16, No. 3, March 1960, pp. 315–318 (copy in Scientific Library).

WILLIAM H. SHORT, *Primary Examiner.*

ALPHONSO SULLIVAN, HAROLD BURSTEIN,
*Examiners.*

R. W. GRIFFIN, S. N. RICE, A. LIBERMAN, T. D. KERWIN, *Assistant Examiners.*